(12) United States Patent
Shimura

(10) Patent No.: US 7,705,794 B2
(45) Date of Patent: Apr. 27, 2010

(54) VEHICLE-MOUNTED COMMUNICATION ANTENNA

(75) Inventor: Kazuhiro Shimura, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 253 days.

(21) Appl. No.: 11/587,872

(22) PCT Filed: Jun. 1, 2005

(86) PCT No.: PCT/JP2005/010028

§ 371 (c)(1),
(2), (4) Date: Oct. 27, 2006

(87) PCT Pub. No.: WO2005/119840

PCT Pub. Date: Dec. 15, 2005

(65) Prior Publication Data

US 2007/0229374 A1 Oct. 4, 2007

(30) Foreign Application Priority Data

Jun. 2, 2004 (JP) ............ 2004-164551

(51) Int. Cl.
*H01Q 1/32* (2006.01)

(52) U.S. Cl. ............ 343/713; 343/766; 343/872

(58) Field of Classification Search ......... 343/700 MS, 343/705, 708, 717, 766, 872, 713
See application file for complete search history.

(56) References Cited

U.S. PATENT DOCUMENTS

| 4,308,540 | A | * | 12/1981 | Winegard et al. ............ 343/749 |
| 5,689,276 | A | * | 11/1997 | Uematsu et al. ............ 343/872 |
| 6,249,242 | B1 | * | 6/2001 | Sekine et al. ............ 342/70 |
| 6,614,389 | B2 | * | 9/2003 | Suzuki et al. ............ 342/70 |
| 6,937,184 | B2 | * | 8/2005 | Fujieda et al. ............ 342/70 |
| 7,375,693 | B2 | * | 5/2008 | Ikeda et al. ............ 343/713 |
| 2004/0036645 | A1 | | 2/2004 | Fujieda et al. |
| 2006/0109178 | A1 | * | 5/2006 | Takeuchi et al. ...... 343/700 MS |

FOREIGN PATENT DOCUMENTS

| JP | 09321515 A | * 12/1997 |
| JP | 10-247809 | 9/1998 |
| JP | 2000-13127 | 1/2000 |
| JP | 2003-110327 | 4/2003 |
| JP | 2003-309409 | 10/2003 |
| JP | 2004-77399 | 3/2004 |

* cited by examiner

*Primary Examiner*—Douglas W Owens
*Assistant Examiner*—Chuc D Tran
(74) *Attorney, Agent, or Firm*—Greer, Burns & Crain, Ltd.

(57) ABSTRACT

A vehicle-mounted communication antenna to be mounted on a vehicle for performing communication by an electromagnetic wave, includes an antenna body having an antenna case and an antenna element contained in the antenna case, and an antenna cover for protecting the antenna body that can transmit the electromagnetic wave.

4 Claims, 2 Drawing Sheets

VEHICLE-MOUNTED COMMUNICATION ANTENNA

TECHNICAL FIELD

The present invention relates to vehicle-mounted communication antennas to be mounted on vehicles for performing communication by electromagnetic waves, and more particularly, to a vehicle-mounted communication antenna that does not easily lose a communication function even if a stone, foreign object or the like strikes thereon.

TECHNICAL BACKGROUND

In order to improve driving safety of a vehicle, there have been recently proposed various devices that can collect information such as air pressure, temperature, etc. in a tire during running to monitor a condition of the tire. In general, these devices include a tire-mounted unit and a vehicle-mounted unit, the tire-mounted unit having a pressure sensor for detecting pressure within the tire and/or a temperature sensor for detecting temperature in the tire, and a transmitter for transmitting a signal detected by the sensor to the vehicle side via an antenna, the vehicle-mounted unit having a receiver for receiving the detected signal transmitted from the transmitter via an antenna, a processor for processing the detected signal received by the receiver and the like; communication is performed by electromagnetic waves between the tire-mounted unit placed in the tire and the vehicle-mounted unit (see patent document 1, for example).

In order to use the devices with no license and no notification, very weak radio waves that do not conflict with the restrictions of the radiowave regulation are employed for the electromagnetic waves used for communication between the tire-mounted unit and the vehicle-mounted unit. The antenna of the vehicle-mounted unit is placed in a tire house near the tire in order to effectively receive a radio wave.

The antenna of the vehicle-mounted unit has an antenna element, and the antenna element is normally contained in an antenna case for protection. However, when a stone, foreign object or the like flipped up by the tire in the tire house strikes on the antenna, it may bring the antenna case to destruction and further break the antenna element to thereby impair the communication function. If the antenna element is broken to thereby lose communication ability, the replacement of the antenna is required; the replacement operation is time consuming, incurring a decrease in vehicle operation efficiency.

Patent Document 1: Japanese Patent Application Kokai Publication No. 2003-63220

DISCLOSURE OF THE INVENTION

An object of the present invention is to provide a vehicle-mounted communication antenna that does not easily lose a communication function even if a stone, foreign object or the like strikes thereon.

In order to achieve the above object, the present invention provides a vehicle-mounted communication antenna to be mounted on a vehicle for performing communication by an electromagnetic wave, comprising an antenna body having an antenna case and an antenna element contained in the antenna case, and an antenna cover for protecting the antenna body that can transmit the electromagnetic wave.

According to the present invention described above, since the antenna element is doubly protected by the antenna case and the antenna cover, easily damaging the antenna element can be avoided even if a stone, foreign object or the like flipped up by a tire strikes on the vehicle-mounted communication antenna when the vehicle-mounted communication antenna is placed in a tire house. Accordingly, collision of the stone, foreign object or the like does not easily impair the communication function of the antenna.

BEST MODES FOR CARRYING OUT THE INVENTION

Embodiments of the present invention will be described in detail below with reference to the attached drawings.

Figure 1:
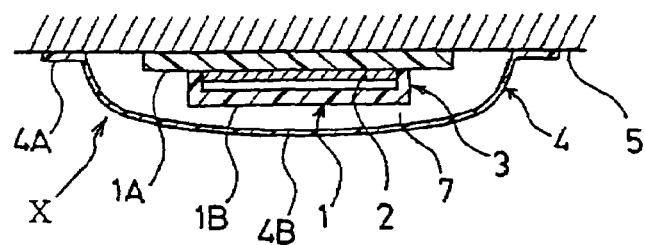
FIG. 1 is a cross-sectional view showing an embodiment of a vehicle-mounted communication antenna according to the present invention in a state where it is mounted on a vehicle body.

Referring to FIG. 1, there is shown an embodiment of a vehicle-mounted communication antenna according to the present invention; reference character X denotes a vehicle-mounted communication antenna to be mounted on a vehicle for performing communication by an electromagnetic wave. The vehicle-mounted communication antenna X includes an antenna body 3 having an antenna case 1 formed of resin and an antenna element 2 contained therein, and an antenna cover 4 for protecting the antenna body 3.

The antenna case 1 includes a plate-shaped attachment part 1A for attaching it to a vehicle body 5, and a case body 1B fixed to the attachment part 1A and containing the antenna element 2; the antenna body 3 is designed to be attached to the vehicle by fixing the attachment part 1A to the vehicle body 5 with screws (not shown). The case body 1B has a waterproofed structure that prevents water from entering into the inside of the case body that contains the antenna element 2.

Figure 2:
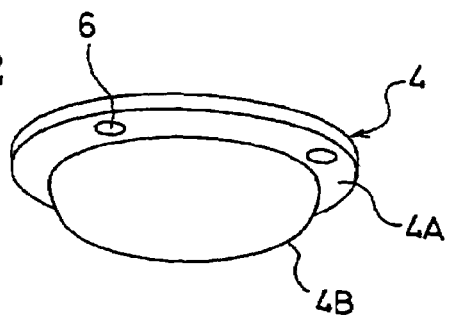
FIG. 2 is a perspective view of the antenna cover in FIG. 1.

The antenna cover 4, which is in the form of a circular dome, includes a cover body 4B in plate form that is placed with a prescribed space over the antenna body 3 mounted on the vehicle body 5, and a flange portion 4A in annular shape that is formed on the circumference of the cover body 4B. The flange portion 4A has, as shown in FIG. 2, attachment holes 6 formed at prescribed intervals along its circumferential direction for attaching the antenna cover to the vehicle body 5; as shown in FIG. 1, the flange portion 4A of the antenna cover 4 is designed to be detachably attached to the vehicle body 5 with screws (not shown) via the attachment holes 6.

A material used for the antenna cover 4 may be any one if the material is a dielectric one that can transmit an electromagnetic wave; examples of the material preferably include acrylic resin, polycarbonate resin, ABS (acrylonitrile butadiene styrene) resin and fluorine resin. These resins may be used alone or in combination.

It should be noted that 'can transmit an electromagnetic wave' referred here means that the electromagnetic wave can be received by the antenna element 2 through the antenna cover 4; each of such states is expressed as 'can transmit an electromagnetic wave'.

The relative permittivity $\varepsilon$ of the dielectric material used for the antenna cover 4 is preferably in the range from 1 to 3. If the relative permittivity $\varepsilon$ exceeds 3, a great increase in attenuation amount changes communication characteristics. More preferably, the relative permittivity $\varepsilon$ is 1. Only the cover body 4B of the antenna cover 4 may be formed of a dielectric material having the above ranged relative permittivity $\varepsilon$.

According to the present invention described above, the antenna element 2 is doubly protected by the antenna cover 4 in addition to the antenna case 1; therefore, when the vehicle-mounted communication antenna X is installed in a tire house, the antenna element 2 is not easily damaged even if a stone, foreign object or the like flipped up by the tire strikes on the vehicle-mounted communication antenna X; accordingly, the vehicle-mounted communication antenna X does not easily lose a communication function.

Since the antenna cover 4 is dome-shaped, it can gain a mechanically high strength even if it is thin in thickness; thus, the antenna cover 4 is not easily brought to destruction even if the stone, foreign object or the like strikes thereon; since there is a prescribed space 7 between the antenna body 3 and the antenna cover 4, even if the stone, foreign object or the like strikes on the antenna cover 4 to thereby destroy it, the influence of the destruction on the antenna body 3 can be prevented.

The vehicle-mounted communication antenna of a tire condition monitoring device is generally placed above a tire in a tire house; even if the antenna cover 4 drops off due to impact, the damage to the tire can be less because the antenna cover is dome-shaped. Since the employment of the dome shape can make the amount of protrusion of the antenna cover 4 less, the vehicle-mounted communication antenna X can be easily attached above a tire in a tire house.

The antenna cover 4 is structured so that it is detachably attached, whereby replacing the antenna cover 4 can be facilitated when it is brought to destruction.

Figure 3:
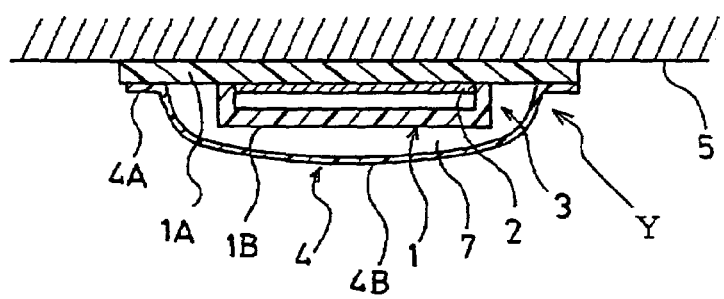
FIG. 3 is a cross-sectional view showing another embodiment of a vehicle-mounted communication antenna according to the present invention in a state where it is mounted on a vehicle body.
Figure 4:
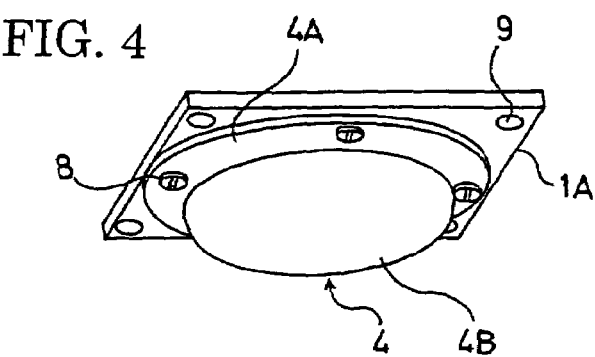
FIG. 4 is a perspective view of the antenna cover in FIG. 3.

Referring to FIGS. 3 and 4, there is shown another embodiment of a vehicle-mounted communication antenna according to the present invention. The vehicle-mounted communication antenna Y of this embodiment is arranged such that the above-described antenna cover 4 is attached to the antenna body 3 in the alternative of the attachment of the antenna cover 4 to the vehicle body 5; other structures are the same as in the vehicle-mounted communication antenna X shown in FIG. 1.

The flange portion 4A of the antenna cover 4 is detachably attached to the attachment part 1A of the antenna case 1 by screws 8 with the cover body 4B of the antenna cover 4 covering the case body 1B. In the drawing, reference numeral 9 denotes an attachment hole formed in the attachment part 1A of the antenna case 1; the antenna body 3 is designed to be attached to the vehicle body 5 with screws (not shown) passing through attachment holes 9.

In the embodiment shown in FIGS. 3 and 4, in addition to the above effects, the position of the antenna cover 4 relative to the antenna body 3 is always fixed, which stabilizes communication characteristics. More specifically, when communication is performed by a radio wave having a very weak transmission strength, the difference of the attachment position of the antenna cover 4 greatly affects on communication characteristics. The attachment of the antenna cover 4 to the antenna body 3 always allows the antenna cover 4 to be attached to the antenna body 3 at the predetermined same optimal position thereof; therefore, stable communication characteristics can be obtained.

Also, the vehicle-mounted communication antenna Y can be mounted on the vehicle body 5 in a state where the antenna cover 4 is previously attached to the antenna body 3; therefore, the number of the steps and the time of the attachment operation to the vehicle body 4 can be reduced in comparison to those of the vehicle-mounted communication antenna X shown in FIGS. 1 and 2.

Figure 5:
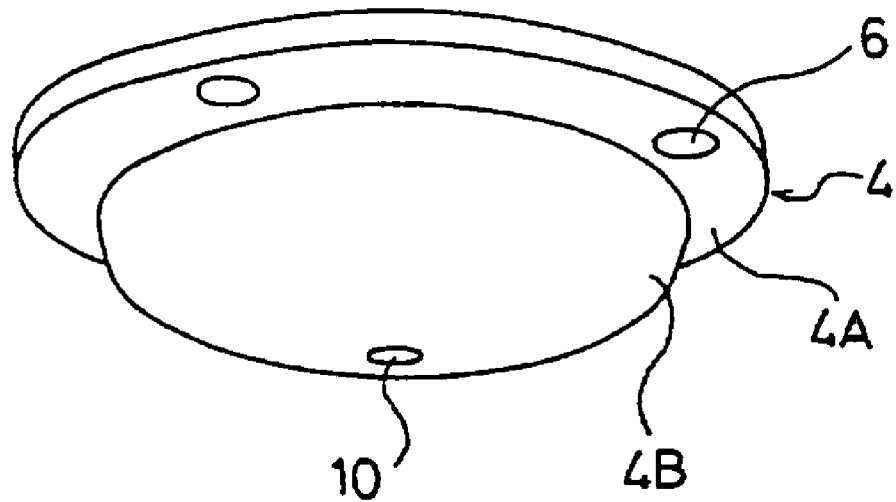
FIG. 5 is a perspective view of another example of the antenna cover.
Figure 6:
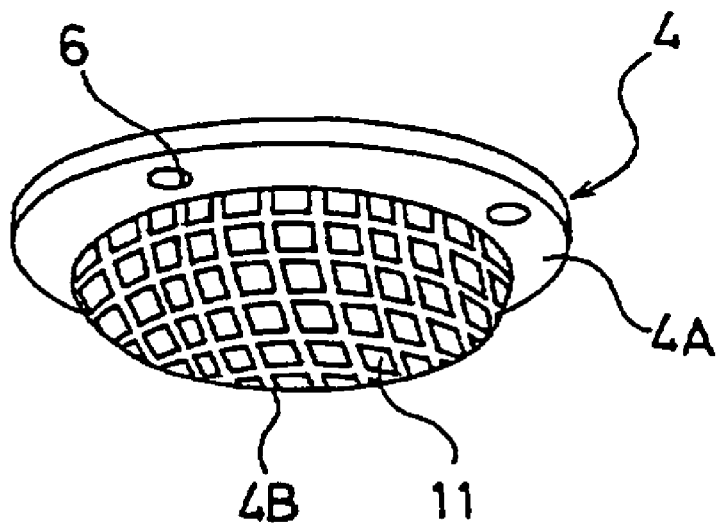
FIG. 6 is a perspective view of still another example of the antenna cover.

In the present invention, the above-described antenna cover 4 may be structured as shown in FIGS. 5 and 6. The antenna cover 4 in FIG. 5 includes a circular-dome-shaped cover body 4B having at its center a drain opening (drain means) 10 which can drain water outside that has entered into the antenna cover 4.

The antenna cover 4 is placed in a tire hose in a state where, as shown in FIGS. 1 and 3, the antenna cover protrudes downward. Therefore, if the antenna cover 4 has water in it, the communication characteristic varies (relative permittivity varies) to badly influence transmitting and receiving when communication is performed by a radio wave having a very weak transmission strength. Even if water enters into the antenna cover 4, it can be drained through the drain opening 10, thus allowing communication characteristics to be always stabilized. As is obvious, the antenna cover 4 may be waterproofed; however, since the attachment operation efficiency thereof decreases, the drain opening 10 is preferably provided as described above.

The antenna cover 4 in FIG. 6 has a circular-dome-shaped cover body 4B with a net-like structure, which has openings 11 as the drain means. This also allows the same effects as the antenna cover 4 in FIG. 5 to be obtained.

If the cover body 4B has a net-like structure as shown in FIG. 6 and the antenna cover 4 is attached to the antenna body 3 in such a manner that communication can be performed (an electromagnetic wave can pass) through the openings 11, the antenna cover 4 may be formed of non-dielectric material such as metal in the alternative of the dielectric material.

It is preferable in terms of communication characteristics that the material, thickness, shape (size of the curved surface of the dome shape), etc. of the above-described antenna cover 4 be suitably adjusted so that the attenuation amount of the electromagnetic wave is equal to or greater than −2 dB and is less than 3 dB when it passes through the antenna cover. It should be noted that the reason why the attenuation amount has a minus (that is, amplification) range is that amplification may happen when the attenuation amount of an electromagnetic wave passing through the antenna cover is actually examined, changing the material, thickness or shape.

In the above embodiments, the antenna cover 4 is detachably attached with screws; however, there is no limitation thereto; the present invention may employ, for example, a structure such that the antenna cover 4 is locked to the vehicle body 4 or the attachment part 1A of the antenna case 1 via slots, or a structure such that the circular-dome-shaped cover body 4B has an internal thread portion formed in an inner surface of the proximal end portion of the cover body, the attachment part 1A of the antenna case 1 is circularly formed and its outer circumferential surface has an external thread portion, and the internal thread portion of the cover body 4B engages the external thread portion of the attachment part 1A.

The cover body 4B of the antenna cover 4 may be, for example, elliptical-dome-shaped in the alternative of being circular-dome-shaped.

The vehicle-mounted communication antenna of the present invention may be an antenna for receiving only, an antenna for transmitting only, or an antenna for receiving and transmitting having both functions of receiving and transmitting.

The present invention is particularly preferably applicable to a vehicle-mounted communication antenna for performing communication by an electromagnetic wave having a frequency band of 300 MHz to 450 MHz, the vehicle-mounted communication antenna being used for a device that can collect information such as air pressure, temperature, etc. in a tire during running with a sensor placed in the tire to monitor a condition of the tire, and being installed in a tire house; however, there is no limitation thereto.

INDUSTRIAL APPLICABILITY

The vehicle-mounted communication antenna of the present invention having the aforementioned excellent effects can be very effectively utilized as a vehicle-mounted communication antenna to be mounted on a vehicle for performing communication by an electromagnetic wave.

What is claimed is:

1. A vehicle-mounted communication antenna to be mounted on a vehicle for performing communication by an electromagnetic wave, comprising an antenna body having an antenna case and an antenna element contained in the antenna case, and an antenna cover for protecting the antenna body that can transmit the electromagnetic wave, wherein the antenna cover is formed of a non-dielectric material and has an attenuation amount that is equal to or greater than −2 dB and is less than 3 dB when the electromagnetic wave passes through the antenna cover, wherein the antenna cover has a dome-shaped cover body that is placed with a prescribed space relative to the antenna body, wherein the antenna case has a waterproofed structure, and the antenna cover has drain openings that can drain water outside which has entered into the antenna cover and a cover body having a net-like structure.

2. A vehicle-mounted communication antenna according to claim 1, wherein the antenna cover has a flange portion to be detachably attached to the vehicle.

3. A vehicle-mounted communication antenna according to claim 1, wherein the antenna cover has a flange portion to be detachably attached to the antenna case.

4. The vehicle-mounted communication antenna according to claim 1, wherein the antenna cover is formed of a metal.

* * * * *